Jan. 4, 1927.  A. OLSEN  1,613,476
HOUSEHOLD ARTICLE
Filed Oct. 20, 1925   2 Sheets-Sheet 1

Alfred Olsen
Inventor
By C A Snow & Co.
Attorneys.

Jan. 4, 1927.
A. OLSEN
1,613,476

HOUSEHOLD ARTICLE

Filed Oct. 20, 1925    2 Sheets-Sheet 2

Alfred Olsen
Inventor

By C A Snow & Co.
Attorneys

Patented Jan. 4, 1927.

1,613,476

UNITED STATES PATENT OFFICE.

ALFRED OLSEN, OF CHICAGO, ILLINOIS.

HOUSEHOLD ARTICLE.

Application filed October 20, 1925. Serial No. 63,734.

The present invention relates to household articles and aims to provide novel means whereby a fruit jar commonly used by housewives may be converted into a pitcher.

An important object of the invention is to provide a device of this character including a movable closure which may be operated to close the mouth of the pitcher to exclude insects such as flies, and foreign matter.

A still further object of the invention is to provide an attachment which may be used in connection with fruit jars of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
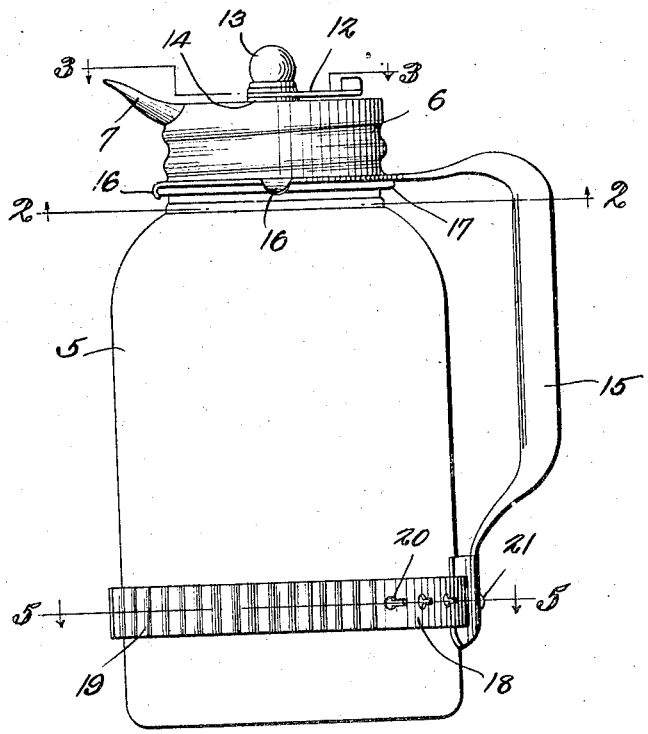
Figure 1 is a side elevational view of a fruit jar supplied with an attachment constructed in accordance with the invention.
Figure 2:
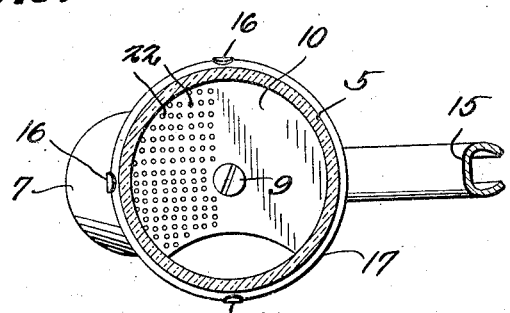
Figure 2 is a sectional view taken on line 2—2 of Figure 1.
Figure 3:
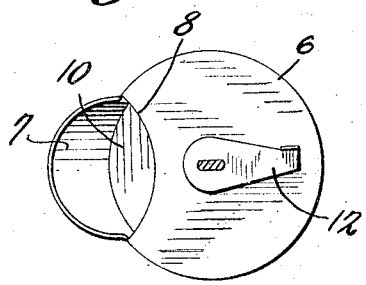
Figure 3 is a sectional view taken on line 3—3 of Figure 1.

Referring to the drawings in detail, the reference character 5 indicates a fruit jar which is of the usual and well known construction, the same being provided with the usual threaded neck.

The device forming the essence of the invention includes a cap indicated by the reference character 6 which is formed with suitable screw threads to permit it to be positioned on the usual threaded neck of the fruit jar as shown by Figure 1. This cap is formed with a lip 7 and is cut away as at 8, to permit fluid to be readily poured from the jar on which the cap is positioned.

A suitable opening is formed in the cap for the reception of the screw 9 that is of a particular construction, the same being provided with flattened side surfaces to permit the screw to be positioned in an elongated opening in the movable closure 10 so that movement of the screw will result in a relative movement of the movable closure to move the closure to its open or closed position.

This closure is provided with a downwardly extended flange 11 adapted to rest on the upper edge of the neck of the fruit jar to insure a fluid-tight connection between the closure and cap.

Figure 4:
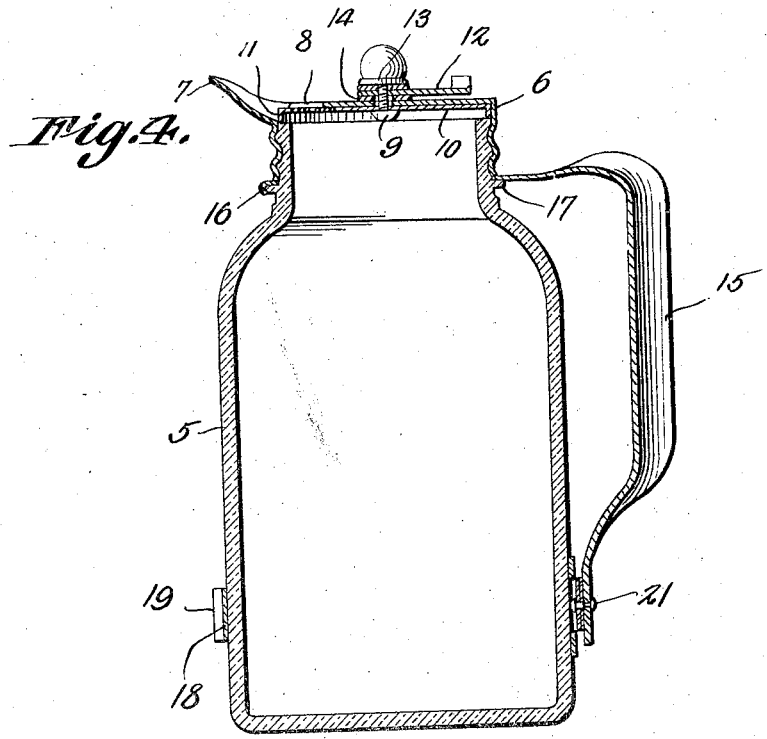
Figure 4 is a longitudinal sectional view through the device.
Figures 5, 6:
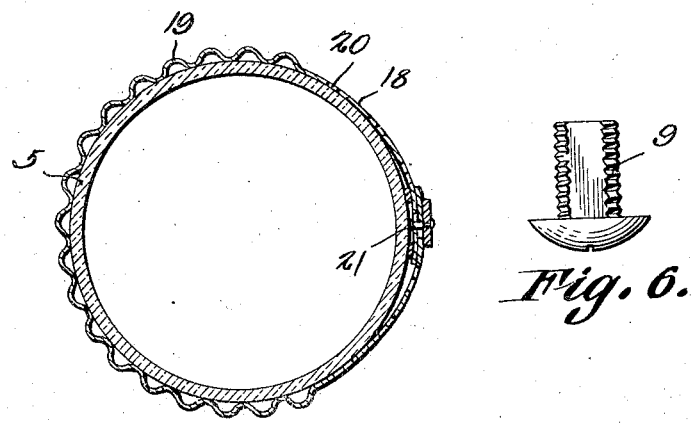
Figure 5 is a sectional view taken on line 5—5 of Figure 1.
Figure 6 is a perspective view of the screw employed for connecting the sliding closure to the device.

As shown by Figure 4, the screw 9 is extended through an elongated opening formed in the operating member 12, to the end that as the operating member 12 is moved, rotary movement is transmitted to the screw 9 which in turn rotates the closure 10 to accomplish its purpose.

In order that the screw 9 will be held in its active position, a threaded washer 13 is provided and mounted on the upper extremity thereof, to the end that the closure 10 and operating member 12 are held in connected relation with each other.

Positioned between the operating member 12 and the cover, is a washer 14 which is adapted to hold the operating member 12 in proper spaced relation with the cover to insure its operation.

A handle indicated at 15 forms an important feature of the invention, and includes a circular portion adapted to be fitted over the neck of the fruit jar, the circular portion being provided with downwardly extended fingers 16 adapted to be bent around the enlargements 17 against which the usual cover washer of a fruit jar rests. Thus it will be seen that due to this construction, the upper portion of the handle may be secured to the fruit jar by means other than the cap, which in reality is positioned on the threaded neck of the fruit jar to clamp the ring member of the handle between the lower end thereof and the enlargement 17.

The lower end of the handle 15 is secured by means of the split band 18 which is corrugated as at 19, to add resiliency thereto. Openings 20 are provided in the adjacent ends of the band and are designed to accommodate the screw 21 that also passes through an opening formed in the lower end of the handle 15 to secure the band to the handle.

From the foregoing it will be obvious that due to the construction, the band may be secured to various sized fruit jars within certain limits, in such a way that the handle will be securely held against movement.

It might be further stated that the closure 10 may be provided with a plurality of openings such as indicated by reference character 22 for straining the material contained in the jar as it passes from the jar.

From the foregoing detail description it is believed that the use of the device will be obvious, and that a further detailed description as to the use of the device is unnecessary.

I claim:

A handle attachment for fruit jars including a handle portion having an opening to permit the handle portion to be fitted over the upper end of a fruit jar, an enlarged offset portion at the opposite end of the handle portion and having openings, a corrugated band positioned around the lower portion of the fruit jar, and means for adjustably securing the ends of the band within the openings of the offset portion.

In testimony that I claim the foregoing as my own, I have hereto affixed my signature.

ALFRED OLSEN.